(No Model.)

R. H. CASSWELL.
CURD MILL.

No. 398,880. Patented Mar. 5, 1889.

Witnesses:
John Grist
Geo. S. Drummond

Inventor:
R. H. Casswell
By Henry Grist
Attorney

UNITED STATES PATENT OFFICE.

RICHARD H. CASSWELL, OF INGERSOLL, ONTARIO, CANADA.

CURD-MILL.

SPECIFICATION forming part of Letters Patent No. 398,880, dated March 5, 1889.

Application filed May 23, 1888. Serial No. 274,852. (No model.) Patented in Canada May 18, 1888, No. 29,176.

*To all whom it may concern:*

Be it known that I, RICHARD HENRY CASSWELL, of Ingersoll, in the Province of Ontario, in the Dominion of Canada, have invented certain new and useful Improvements in Curd-Mills, (for which I have received a patent of the Dominion of Canada, No. 29,176, dated May 18, 1888;) and I do hereby declare that the following is a full, clear, and exact description of the same, reference being had to the accompanying drawings, in which—

Figure 1:
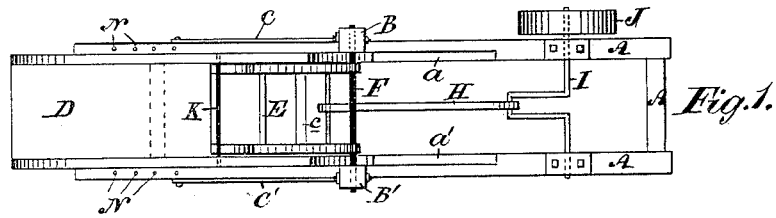
Figure 2:
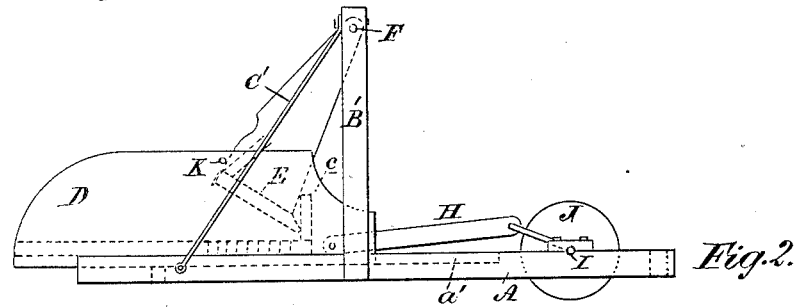
Figure 3:
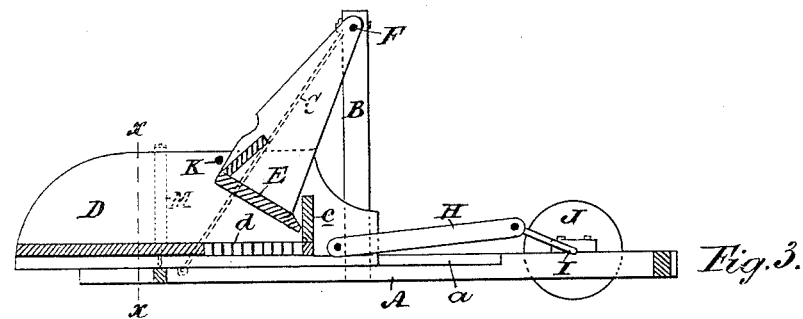
Figure 4:
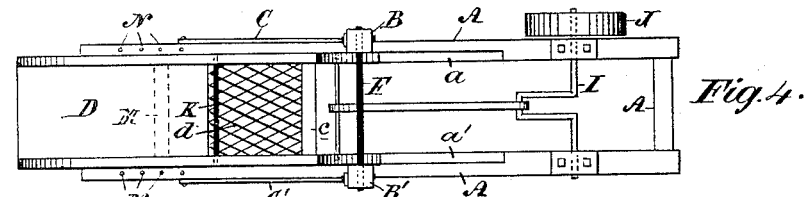
Figures 5, 6:
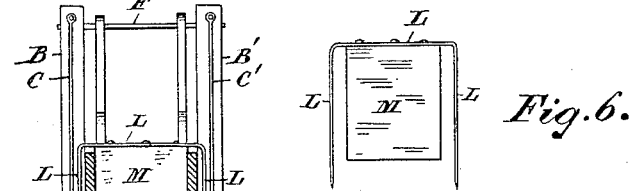

Figure 1 is a top view of my improved curd-mill. Fig. 2 is a side elevation of the same. Fig. 3 is a longitudinal vertical section of the same. Fig. 4 is a top view of my improved mill, the swinging presser removed to show the intersecting knives underneath. Fig. 5 is a section on line X X, Fig. 3, showing a gate, when such is desired; and Fig. 6 is a front elevation of said gate detached from the trough.

My invention has for its object to accomplish the cutting of curd expeditiously and in an improved manner.

My invention consists of a curd-mill comprising a frame, a reciprocating trough, a swinging presser, and a crank-shaft and pitman to reciprocate the trough, which trough is provided with diagonally-crossed knives in a portion of the bottom underneath the presser, and said presser is swung by the reciprocation of the trough to force the curd between the knives.

A is a horizontal rectangular frame of the mill, and B B' posts affixed to said frame and supported by braces C C'. The longitudinal rails of the frame are provided with grooves *a a'*, in which slide a trough, D, having an opening in the bottom near the inner end, said opening provided with diagonally-intersecting knives *d* to cut lozenge-shaped figures by pressing the curd through the knives.

E is a swinging presser hung on a bar, F, connecting the posts B B'. The presser swings from a perpendicular position, and in such position the bottom is in contact with the knives; but when the presser is swung forwardly, or toward the open or feed end of the trough, the knives and bottom of the presser will be exposed from the front. The curd is then fed to the knives by being pushed under the presser, and the presser, returning to a vertical position, will gradually force the curd through the knives, and the curd will be cut into small pieces and fall into a receptacle placed to receive it. The swinging of the presser is effected by the reciprocation of the trough, and the reciprocation of the trough is effected by a pitman, H, and crank-shaft I, journaled to frame A and carrying a pulley, J, which is driven by a belt from suitable motive power. When the trough is moved forward by the pitman, the closed end *c* of the trough pushes the presser onward and exposes the bottom of the presser from the front of the trough, and when the trough recedes a bar, K, across the trough pushes the presser to close against the knives and effect the cutting of the curd.

When it is desired to cut the curd a second time, use is made of a removable gate, M, (shown in elevation in dotted lines in Figs. 5 and 6, and its position within the trough by dotted lines in Fig. 3.) The gate is a flat board held stationary crosswise of the trough by a bar, L, bent to form three sides of a rectangle, the top edge of the gate secured to the horizontal middle portion of the bar. The legs of the bar extend below the lower edge of the gate, and said legs stand off from the vertical edges of the gate and parallel thereto. The frame A is provided with a hole or holes on opposite sides of the trough to receive the legs or bar L and support the gate vertically in the trough without contact with the sides or bottom, and the gate remains stationary while the trough reciprocates, so that at each return reciprocation of the trough the curd will be pressed against the gate and forced under the presser to be recut by the knives.

At the first cutting, the curd being unbroken, it can be pushed solidly by hand under the presser, and therefore the gate need only be used when the curd is broken, or after the first cutting.

I claim as my invention—

1. In a curd-mill, the combination, with a supporting-frame, A, having posts B B', of a swinging presser, E, hung from said posts, and a trough, D, under the presser, said trough having an aperture in the bottom provided with intersecting knives *d*, and an end, *c*, and cross-bar K, to swing the presser when the trough is reciprocated to alternately expose and cover the knives, for the purpose set forth.

2. In a curd-mill, the combination, with a supporting-frame, A, of the reciprocating trough D, having an aperture in the bottom, provided with diagonally-intersecting knives d, a swinging presser, E, hung from posts B B' of said frame and between an end, c, and cross-bar K of the trough, and a pitman, I, and crank-shaft H to reciprocate the trough, whereby the knives are exposed when the presser swings from the perpendicular, and the presser closes upon the knives when at the perpendicular, for the purpose set forth.

3. In combination with the reciprocating trough D and the supporting-frame A, the gate M, secured at top to a bent bar, L, straddling the trough and standing in holes in the frame, whereby the gate will remain stationary crosswise of the trough when the trough is reciprocated, for the purpose set forth.

R. H. CASSWELL.

Witnesses:
JNO. ANDREWS,
GEO. F. CLARK.